(12) United States Patent
Nakamura et al.

(10) Patent No.: US 7,916,414 B2
(45) Date of Patent: Mar. 29, 2011

(54) ACTUATOR FOR LENS DRIVING MECHANISM

(75) Inventors: Manabu Nakamura, Kitasaku-gun (JP); Yuzuru Suzuki, Kitasaku-gun (JP); Hiroyuki Furusaki, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 12/591,676

(22) Filed: Nov. 27, 2009

(65) Prior Publication Data
US 2010/0134906 A1    Jun. 3, 2010

(30) Foreign Application Priority Data

Dec. 2, 2008 (JP) ................................. 2008-307851

(51) Int. Cl.
*G02B 7/02* (2006.01)
(52) U.S. Cl. ........................................ 359/824; 359/822
(58) Field of Classification Search .................. 359/824, 359/822
See application file for complete search history.

(56) References Cited

U.S. PATENT DOCUMENTS 5,392,159 A * 2/1995 Sasaki et al. .................. 359/691
5,784,206 A * 7/1998 Nomura et al. ............... 359/698
2007/0147195 A1* 6/2007 Morinaga ................... 369/44.14

FOREIGN PATENT DOCUMENTS

JP    A-2000-275497    10/2000
JP    A-2002-287002    10/2002
JP    B2-3809026    8/2006

* cited by examiner

*Primary Examiner* — Ricky L Mack
*Assistant Examiner* — James C Jones
(74) *Attorney, Agent, or Firm* — Oliff & Berridge, PLC

(57) ABSTRACT

An actuator includes: a rotary shaft allowed to axially and including a threaded portion at a protruding portion thereof and two idle regions disposed respectively at both ends of the threaded portion; a movable structure adapted to travel along the rotary shaft; a stopper means facing the end of the protruding portion of the rotary shaft and configured to restrict the axial movement of the movable structure located at the idle region; an open space disposed between the stopper means and the end of the rotary shaft and configured to allow the rotary shaft to axially move; an urging means for urging the movable structure toward the motor; and a recovery means for urging the movable structure toward the threaded portion by a magnetic thrust force exerted by cutting off power supply to the motor when the movable structure is in contact with the stopper means.

8 Claims, 6 Drawing Sheets

F I G. 6
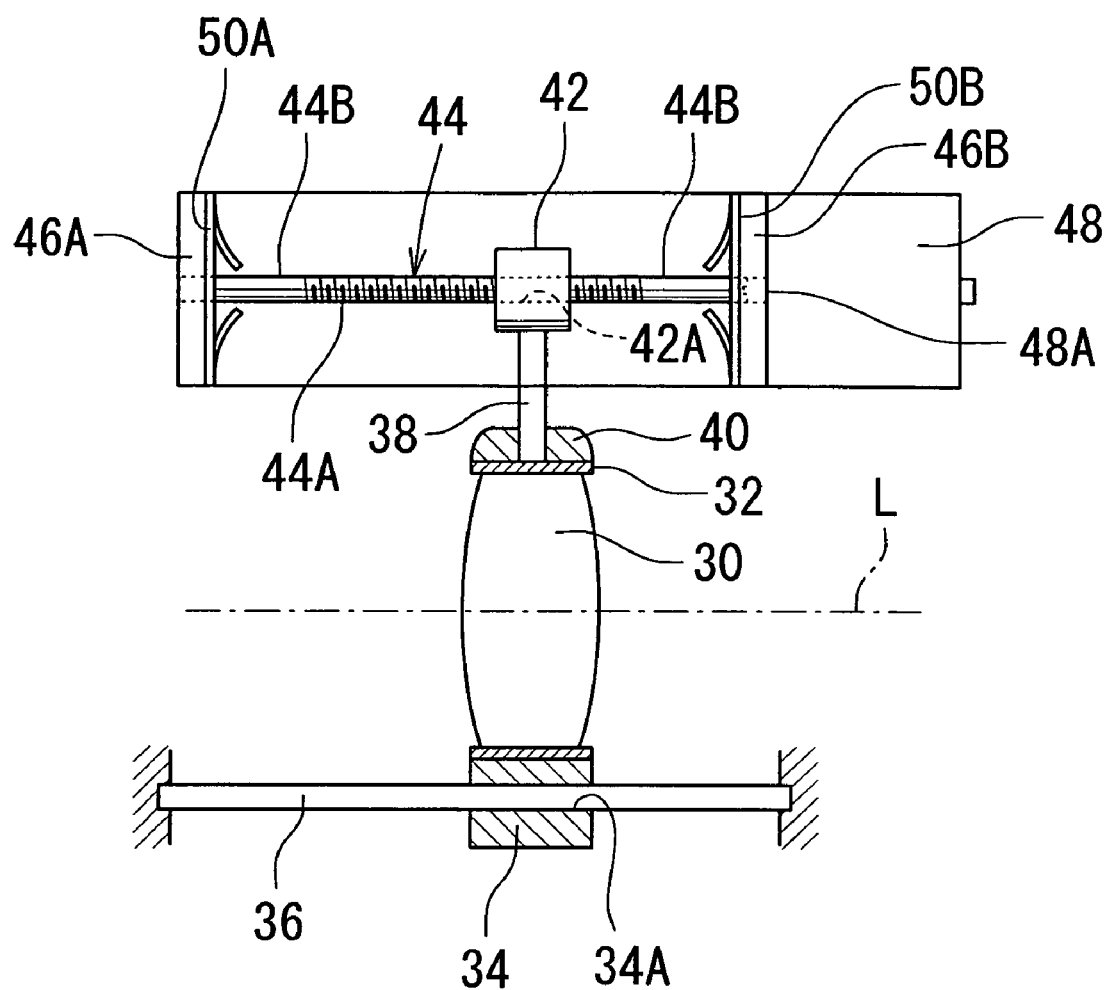

ACTUATOR FOR LENS DRIVING MECHANISM

BACKGROUND OF THE INVENTION

1. Field of the Invention

The present invention relates to an actuator, specially an actuator for a lens driving mechanism, which activates, for example, a pickup in an optical disk drive or a lens in a camera, and more particularly to an actuator for a lens driving mechanism, in which a lead screw rotated by a motor is incorporated.

2. Description of the Related Art

Conventionally, a stepping motor with a lead screw is widely used as an actuator for activating a pickup in an optical disk drive such as a CD drive, a DVD drive or the like, or for activating a lens in an automatic focus control system or a zoom system of a camera. For moving such a lens in the optical axis direction, a gear formed at a portion of a lens frame is adapted to mesh with a threaded portion of the lead screw of the motor (refer to, for example, Japanese Patent Application Laid-Open No. 2000-275497).

FIG. 6 shows a conventional lens driving mechanism disclosed in Japanese Patent Application Laid-Open No. 2000-275497. A lens 30 is held by a lens frame 32, and a guide member 34 is fixedly attached to the bottom portion of the lens frame 32. The guide member 34 has a throughhole 34A, and a guide rod 36 fixed to a lens cylinder (not shown) is passed through the throughhole 34A. Accordingly, the lens 30 is supported slidably in the axis direction of the guide rod 36 (direction of an optical axis L).

On the other hand, a retention member 40 to which one end of a pin 38 is fixed is fixedly attached to the top portion of the lens frame 32, and a rectangular block member 42 made of resin, such as plastic, is attached to the other end of the pin 38. A threaded hole 42A is formed through the center of the block member 42 in the direction of the optical axis L, and a feed screw 44 is engaged with the threaded hole 42A.

Consequently, the lens 30 is supported by the guide rod 36 as well as the feed screw 44 so as to be movable in the direction of the optical axis L. In this connection, since the feed screw 44 works well as a guide rod for the lens 30 due to its engagement with the block member 42, a dedicated guide member for supporting the top portion of the lens 30 does not have to be provided.

The both ends of the feed screw 44 are rotatably supported respectively by front and rear arms 46A and 46B of a frame member 46 having a square U shape. A stepping motor 48 is attached to the rear arm 46B of the frame member 46, and an output shaft 48A of the stepping motor 48 is jointed to the feed screw 44. Consequently, when the stepping motor 48 rotates, the feed screw 44 jointed to the output shaft 48A of the stepping motor 48 rotates, whereby the block member 42 whose threaded hole 42A is engaged with the feed screw 44 is caused to move along the axis of the feed screw 44, in conjunction with which the lens 30 moves linearly in the direction of the optical axis L.

The feed screw 44 includes a threaded portion 44A which has a screw thread (male screw), and plain portions 44B, 44B which have no screw thread and are located respectively at the both ends of the feed screw 44 so as to sandwich the threaded portion 44A. The block member 42, when positioned at the threaded portion 44A, meshes with the feed screw 44 via the threaded hole 42A and is caused to move along the axis of the feed screw 44 with the rotation of the feed screw 44. On the other hand, when positioned at any of the plain portions 44B, 44B, the block member 42 is free from engagement with the feed screw 44 thus becoming freely slidable, which prohibits the block member 42 from moving along the axis of the feed screw 44 even when the feed screw 44 rotates.

In view of the above mechanism for controlling the position of the lens 30, the stepping motor 48 is controlled and driven so that the block member 42 travels within a range where the block member 42 is kept in engagement with the threaded portion 44A. However, if the stepping motor 48 goes out of control and runs abnormally causing the feed screw 44 to keep rotating in the same one direction, the block member 42 moves off from the threaded portion 44A to one of the plain portions 44B, 44B.

Under the condition described above, the block member 42 is disengaged from the feed screw 44, and the feed screw 44 rotates freely alone. Thus, with this mechanism, when the stepping motor 48 runs abnormally, the lead screw 44 is prevented from keeping engagement with the block member 42, which consequently allows the lead screw 44 to rotate idle and therefore prevents damages of the screw threads formed on both the feed screw 44 and the block member 42

Plate springs 50A and 50B urging the block member 42, which is moved to the plain portions 44B and 44B of the feed screw 44, back toward the threaded portion 44A are disposed respectively at the front and rear arms 46A and 46B of the frame member 46. So, in the case if the stepping motor 28 runs abnormally and drives the block member 42 to either of the plain portions 44B, 44B of the feed screw 44, when the stepping motor 28 starts running normally again and rotating in the reverse direction, the block member 42 is readily brought back to the threaded portion 44A for engagement therewith by the urging force of the plate spring 50A or 50B thus returning to the normal operation.

Another conventional lens driving mechanism is disclosed in Japanese Patent No. 3809026, in which an idle region for preventing forced engagement is provided at an output shaft of a driving source for a lens holder. Referring to FIG. 7, the abovementioned lens driving mechanism for an imaging device includes: a three-arm frame 51 adapted to hold a lens P and including a bearing portion to support a guide rod 56 for guiding the lens P in the direction of the optical axis of the lens P; a driving mechanism including a lead screw 53a provided with a threaded portion 53b to engage with a nut portion 52, and a stepping motor 53 to rotate the lead screw 53a; an arm 54 extending from the three-arm frame 51 so as to make contact with the nut portion 52 of the driving mechanism wherein the three-arm frame 51 is moved according to the movement of the nut portion 52; a spring 55 set in contact with an end of the three-arm frame 51 and adapted to work on the three-arm frame 51 so as to urge the arm 54 toward the nut portion 52; and an idle region 53c disposed only at an end of the lead screw 53a located closer to the arm 54 than to the nut portion 54 and having a cylinder shape with a diameter to prohibit engagement with the nut portion 52. In the above lens driving mechanism, the idle region 53c is disposed only at one end of the lead screw 53a, wherein the nut portion 52 is moved toward the idle region 53c by a control means when an error occurs.

Still another conventional lens driving mechanism (lens focus system) is disclosed in Japanese Patent Application Laid-Open No. 2002-287002, in which a lens unit 60 is prevented from being urged into forced engagement with the proximal end portion or the distal end portion of a rotary shaft 63 of a stepping motor 62 as shown in FIG. 8. In the above lens focus system, the lens unit 60 is engaged with a threaded portion 61a of the rotary shaft 63 thereby causing the lens unit 60 to move along the rotary shaft 63 when the stepping motor 62 rotates, wherein idle regions 64b and 64c which allow the rotary shaft 63 to rotate idle with respect to the lens unit 60 are disposed respectively at the proximal and distal end portions of the rotary shaft 63 as a lead screw. The lens focus system further includes urging members 65 and 66 which work on the lens unit 60 so that the lens unit 60 stays within the threaded portion 61a of the rotary shaft 63.

In the lens driving mechanism disclosed in Japanese Patent Application Laid-Open No. 2000-275497, which substantially includes the stepping motor, the feed screw connected to the output shaft of the stepping motor and the frame member having a square U shape and adapted to support the feed screw, since the plate springs as urging members must be provided at the frame member, the number of components is increased, the size is increased, and the cost of the entire mechanism cannot be reduced.

In the lens driving mechanism disclosed in Japanese Patent No. 3809026, the idle region is provided only at one end of the lead screw, and therefore the lens cylinder can be shortened. However, the nut portion must be moved toward the idle region for each initial alignment of the lens thus causing a delay corresponding to the move time and the movement is forced to start from the initially set position. Also, one end of the three-arm frame located opposite to the end in contact with the spring is caused to bump against another constituent member, and therefore the constituent members concerned here must have a high strength.

In the lens driving mechanism disclosed in Japanese Patent Application Laid-Open No. 2002-287002, both end portions of the rotary shaft are each provided with an idle region so as to sandwich the threaded portion, a guide rod is inserted through the lens unit which is disposed movably in a housing, and first and second springs as urging means are disposed respectively at both ends of the housing. As a result, the number of components is increased, the size is increased and the cost of the entire mechanism cannot be reduced like in the mechanism of Japanese Patent Application Laid-Open No. 2000-275497.

SUMMARY OF THE INVENTION

The present invention has been made in light of the problems described above, and it is an object of the present invention to provide an actuator for a lens driving mechanism provided with a device in which a movable structure which, when a motor runs abnormally, is adapted to allow a lead screw of a rotary shaft of the motor to rotate idle, readily returns into engagement with the lead screw for normal operation, wherein the number of components is not increased thus reducing production cost.

In order to achieve the object described above, according to an aspect of the present invention, there is provided an actuator for a lens driving mechanism, which includes: a motor including a stator and a rotor which includes a rotary shaft and a magnet fixed around the rotary shaft, wherein a threaded portion is disposed at a portion of the rotary shaft axially protruding from one end of the motor, and wherein two idle regions are disposed respectively at both ends of the threaded portion; a movable structure which meshes with the rotary shaft and to which a lens is attached, wherein the movable structure, when located at the threaded portion, travels along the rotary shaft by the rotation of the rotary shaft, and wherein the motor runs idle with respect to the movable structure when the movable structure is located at the idle region; a stopper means configured to restrict the axial movement of the movable structure; an open space disposed inside the motor and configured to allow the rotary shaft to axially move; an urging means for urging the movable structure toward the motor; and a recovery means for bringing the movable structure toward the threaded portion of the rotary shaft by a magnetic thrust force when the movable structure is moved to one of the idle regions so as to make contact with the stopper means.

With the structure described above, when the movable structure is moved to the idle region and comes into contact with the stopper means, the movable structure is disengaged from the threaded portion of the rotary shaft thereby allowing the rotary shaft to rotate idle while the rotary shaft is urged constantly toward the motor by the urging means to urge the movable structure toward the motor, and the movable structure is brought into contact with the threaded portion by the recovery means for regaining the normal operation. Thus, the movable structure comes into contact with the threaded portion by the urging means and the recovery means and consequently can get smoothly on the threaded portion when the motor is restarted.

In the aspect of the present invention, the recovery means may be constituted by a magnetic thrust force present between the stator and the magnet of the rotor. Also, the magnetic thrust force induced may result from the misalignment caused by the axial movement of the rotor between the magnetic center of the magnet of the rotor and the magnetic center of the stator. The movable structure is caused to move and come into contact with the threaded portion of the rotary shaft when the misalignment between the magnetic center of the magnet of the rotor and the magnetic center of the stator is corrected by the magnetic thrust force, whereby the motor is allowed to readily return to the normal operation.

In the aspect of the present invention, the motor may be a stepping motor in which the stator includes two stator sub-assemblies stacked axially on each other, each of the stator sub-assemblies including a yoke composed of inner and outer yokes both having a plurality of pole teeth at their inner circumferential surface, a bobbin, and a winding wound in a ring form around the bobbin and disposed inside the yoke, and in which the magnet of the rotor has a cylindrical shape, is disposed inside the stator with the rotary shaft rotatably supported by two bearings and is sandwiched between the two bearings such that a gap formed between one bearing and the magnet is greater than a gap formed between the other bearing and the magnet, wherein the magnetic thrust force is exerted when at least one of the two stator sub-assemblies is excited. Further, the magnet of the rotor may be axially separated into two segments radially opposing the two sub-assemblies, respectively.

In the aspect of the present invention, the stopper means may be two bent-up side plates of a bracket to which the motor is attached, and the urging means may be a coil spring disposed over a guide rod which passes through a through-hole of the movable structure and which is oriented parallel to the rotary shaft.

In the actuator for a lens driving mechanism according to the present invention, the movable structure, which, when the motor runs abnormally, is located at the idle region thus allowing the rotary shaft to rotate idle, is adapted to readily mesh with the threaded portion for the normal operation thanks to the urging means and/or the recovery means activated by a magnetic thrust force. Consequently, the resulting actuator for a lens driving mechanism can be simply structured without increasing the number of components, thus reducing the production cost.

BRIEF DESCRIPTION OF THE DRAWINGS

FIG. 6 is a schematic view of a conventional actuator for a lens driving mechanism;

DETAILED DESCRIPTION OF THE INVENTION

Figure 1:
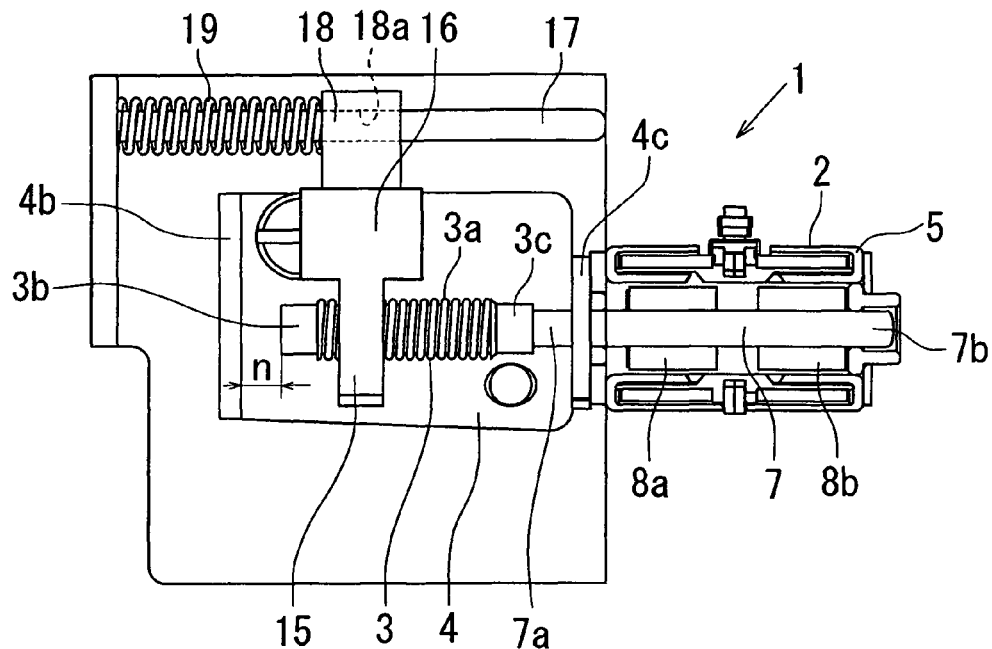
FIG. 1 is a plan view of an actuator for a lens driving mechanism according to an embodiment of the present invention.
Figure 2:
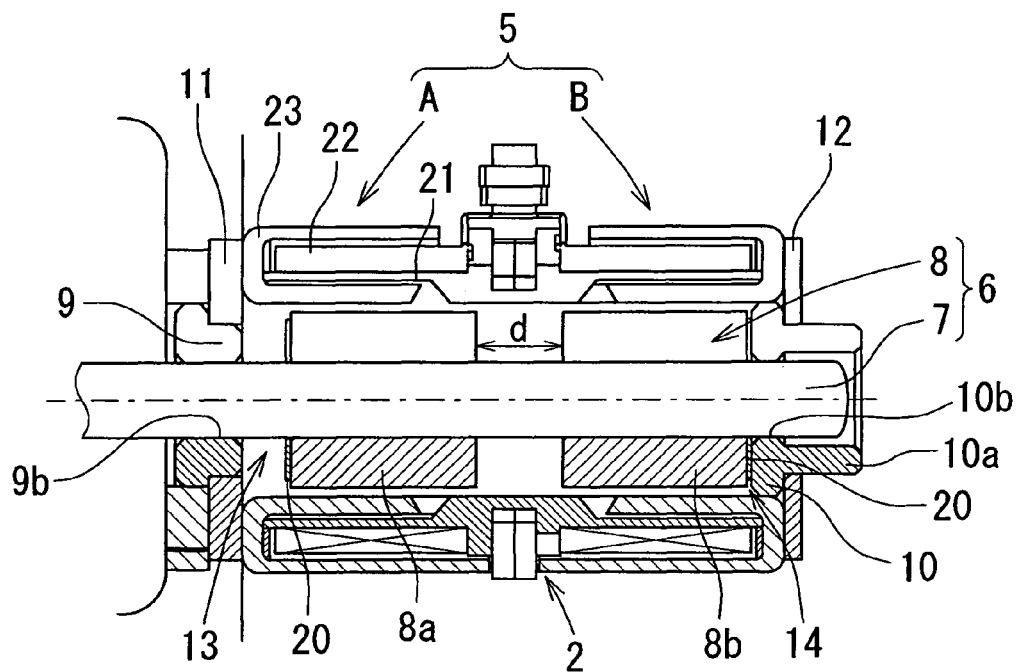
FIG. 2 is an enlarged view of a portion of a motor shown in FIG. 1.

An exemplary embodiment of the present invention will hereinafter be described with reference to the accompanying drawings. FIG. 1 shows a structure of an actuator 1 for a lens driving mechanism according to an embodiment of the present invention, and FIG. 2 shows an enlarged partial cross section of a motor portion shown in FIG. 1. Referring to FIG. 1, the actuator 1 for a lens driving mechanism (hereinafter referred to simply as "actuator" as appropriate) basically includes a motor 2, a lead screw 3 and a bracket 4.

In FIGS. 1 and 2, the motor 2 is, for example, a PM stepping motor, and includes a stator 5 of two-phase structure, and a rotor 6 which, in the present embodiment, is a dual-magnet rotor including a shaft 7 and a double magnet 8 and which is disposed inside the stator 5. The stator 5 is composed of two stator sub-assemblies A and B which are structured identically with each other and axially stacked on each other, and each of which includes a bobbin 21, a winding 22 wound in a ring around the bobbin 21, and a stator yoke composed of inner and outer yokes disposed to enclose the winding 22 wherein a plurality of pole teeth are provided at the inner circumferential surface of each of both the inner and outer yokes.

The shaft 7 of the rotor 6 is rotatably supported by front and rear bearings 9 and 10. The front and rear bearings 9 and 10 are both made of a sintered copper metal retaining oil, include a small diameter portion and a large diameter portion, and which respectively include through-holes 9b and 10b formed at the center so as to allow the shaft 7 to pass through. The front and rear bearings 9 and 10 are disposed such that the front bearing 9 is press-fitted into a center opening of a front plate 11 fixed to the outer axial end face of the stator sub-assembly A wherein no portion of the front bearing 9 is located axially inside the stator sub-assembly A, while the rear bearing 10 is press-fitted into the stator sub-assembly B wherein a portion of the rear bearing 10 is located axially inside the stator sub-assembly B. A rear plate 12 is fixed to the outer axial end face of the stator sub-assembly B, and a hollow cylindrical boss 10a constituting the small diameter portion of the rear bearing 10 protrudes through a center opening of the rear plate 12.

The aforementioned lead screw 3 is disposed so as to extend axially from a front end (protruding end) 7a of the shaft 7 and includes a threaded portion 3a, and first and second idle regions 3b and 3c which are not threaded, have a diameter equal to or smaller than the root diameter of the threaded portion 3a, and which are formed at respective both end portions of the lead screw 3 so as to sandwich the threaded portion 3a.

The double-magnet 8, which is composed of two magnet segments 8a and 8b having a cylindrical shape and structured identically with each other, is fixedly attached at a portion of the shaft 7 located closer to its rear end 7b. The two magnet segments 8a and 8b are multipole-magnetized circumferentially, separated axially from each other with a predetermined distance d provided therebetween and oppose radially the stator sub-assemblies A and B, respectively. A gap 13 is formed between the magnet segment 8a and the front bearing 9, and a gap 14 is formed between the magnet segment 8b and the rear bearing 10.

The gap 13 is determined to range, for example, from 0.3 to 0.6 mm which is larger by about 0.1 mm than a gap range conventionally and generally arranged, whereby the rotor 6 is allowed to travel farther in the thrust direction. A resin washer 20 (for example, POLYSLIDER) having good slidability is disposed in each of both the gaps 13 and 14.

The bracket 4 is a plate member with both end portions bent up thus having a cross section of square-U (refer to FIG. 3B and so on) and functions to attach the motor 2 to an apparatus or a frame of an apparatus. Specifically, the bracket 4 integrally includes a main plate 4a, a distal side plate 4b and a proximal side plate 4c (both working as stopper means) disposed at respective ends of the main plate 4a so as to stand up substantially orthogonally to the main plate 4a. The bracket 4 is attached to the motor 2 such that the proximal side plate 4c is fixed to the front plate 11 of the motor 2.

Referring to FIG. 1, the actuator 1 further includes a movable structure which includes a movable member body 16, a nut portion 15 adapted to mesh with the threaded portion 3a of the lead screw 3, and a guide block portion 18 to which a signal pickup device (not shown) is attached. A through-hole 18a is formed in the guide block portion 18 in the direction of the shaft 7 of the rotor 6, and a guide rod 17 passes through the through-hole 18a. The guide rod 17 is disposed parallel to the lead screw 3 and has a coil spring 19 disposed therearound.

The coil sprig 19 functions to urge the guide block portion 18 of the movable structure toward the motor 2 thereby moving the nut portion 15 toward the motor 2. Consequently, the magnet segment 8b of the rotor 6 is caused to press the resin washer 20 against the rear bearing 10 thus decreasing and eventually eliminating the gap 14. In this connection, the pickup device (not shown) attached to the guide block portion 18 in the above description may alternatively be attached to the nut portion 15.

Referring to FIG. 1, a clearance n is provided between the distal end of the lead screw 3 and the distal side plate 4b of the bracket 4. The bracket 4 is first attached to the motor 2, and then the nut portion 15 of the movable structure is attached to the lead screw 3 such that the nut portion 15 is guided through the clearance n and set in mesh with the threaded portion 3a.

Figure 3A:
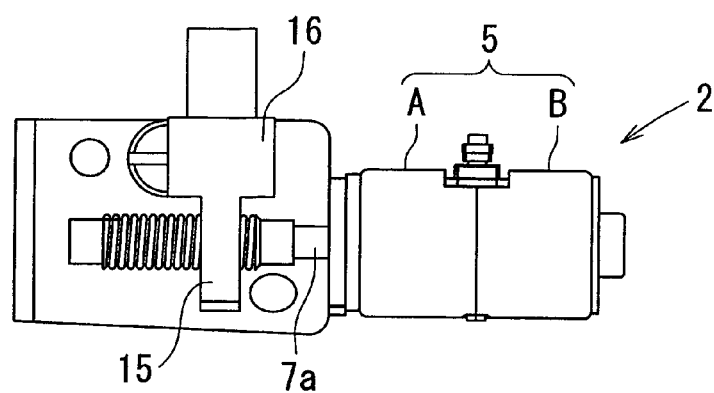
FIGS. 3A and 3B are schematic views of an operational state where a nut portion of a movable structure meshes with a lead screw, respectively showing a top plan and a side with a cross sectioned motor portion.
Figure 3B:
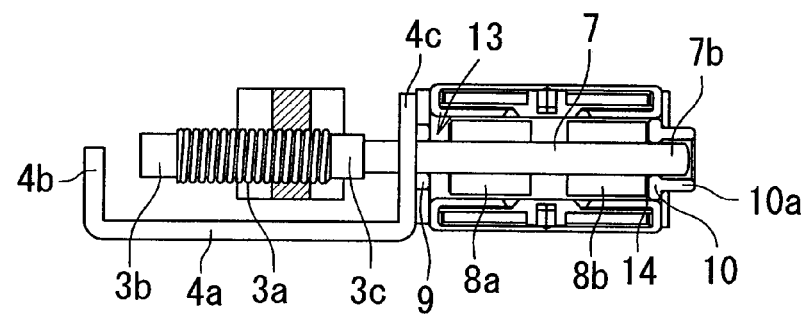
Figure 4A:
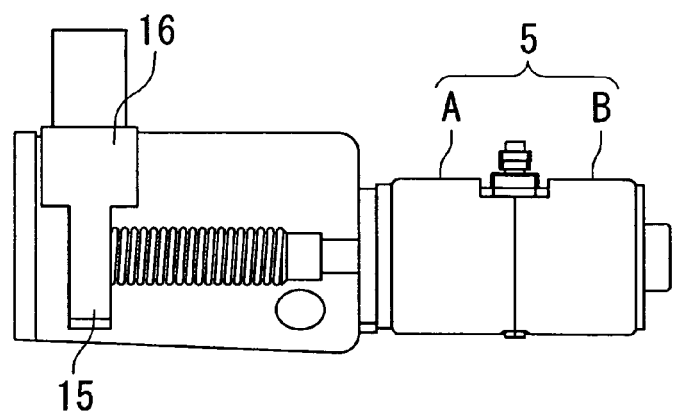
FIGS. 4A and 4B are schematic views of another operational state where the nut portion is brought to a first idle region formed at the left end of the lead screw thereby allowing the motor to run idle, wherein FIGS. 4A and 4B respectively show a top plan and a side view with a cross sectioned motor portion.
Figure 4B:
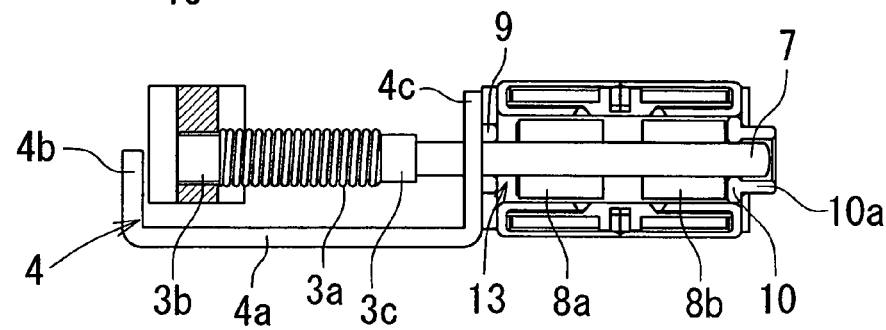
Figure 5A:
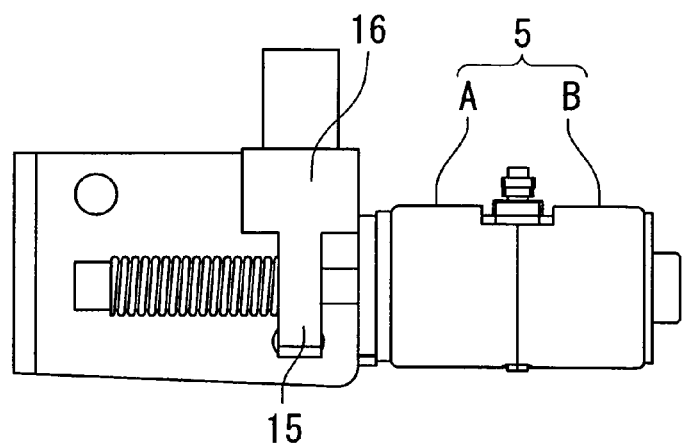
FIGS. 5A and 5B are schematic views of yet another operational state where the nut portion is brought to a second idle region formed at the right end of the lead screw thereby allowing the motor to run idle, wherein FIGS. 5A and 5B respectively show a top plan and a side with a cross sectioned motor portion.
Figure 5B:
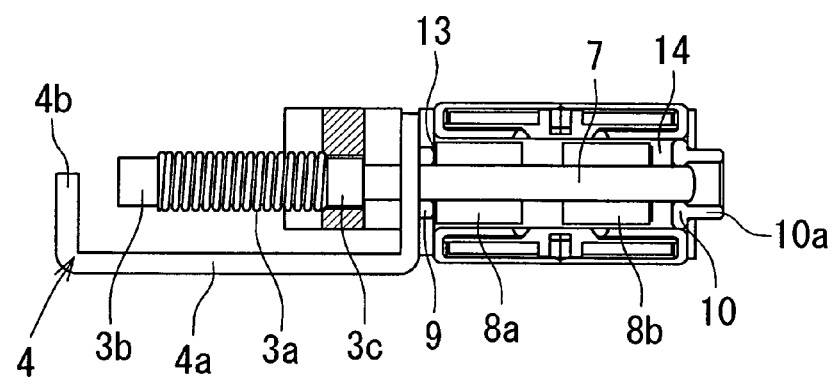
Figure 7:
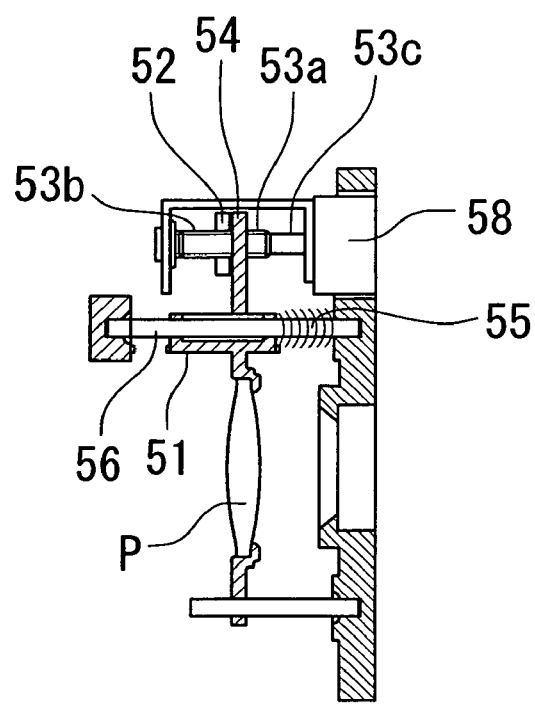
FIG. 7 is a schematic view of another conventional actuator for a lens driving mechanism.
Figure 8:
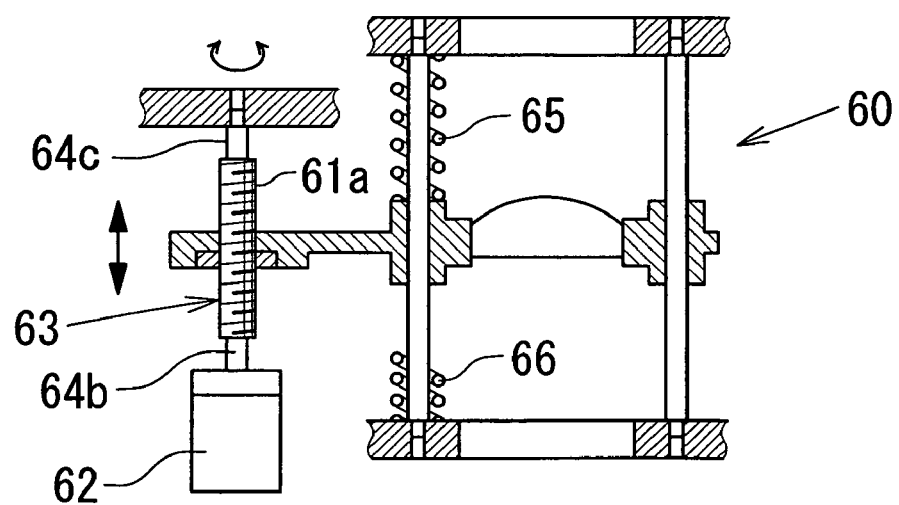
FIG. 8 is a schematic view of yet another conventional actuator for a lens driving mechanism.

Description will now be made on the operation of the actuator 1 for a lens driving mechanism according to the present invention. FIGS. 3A and 3B show a normal operational state where the nut portion 15 of the movable structure is engaged with the threaded portion 3a of the lead screw 3, FIGS. 4A and 4B show an abnormal operational state where the nut portion 15 is brought to the distal end of the threaded portion 3a of the lead screw 3 but a stop signal is not given to the motor thus allowing the nut portion 15 to arrive at the idle region 3b of the lead screw 3, and FIGS. 5A and 5B show another abnormal operational state where the nut portion 15 is brought to the proximal end of the threaded portion 3a of the lead screw 3 but a stop signal is not given to the motor thus causing the rotor to move gradually toward the front bearing 9 (left direction in the figure) which allows the nut portion 15 to arrive at the idle region 3c of the lead screw 3.

(Operational State Illustrated in FIG. 3A/3B)

The Motor 2, when Controlled to Run Normally, Operates (Rotate and Stop) in such a manner that the nut portion 15 of the movable structure stays within the effective range of the threaded portion 3a of the rotary shaft 3 so that the movable member body 16 of the movable structure does not come into contact with either of the distal and proximal side plates 4b and 4c (stopper means) of the bracket 4. That is to say, in the case if the nut portion 15 of the movable structure is located on the threaded portion 3a of the lead screw 3 as shown in FIG. 3A/3B, when the stator sub-assemblies A and B are excited according to a drive signal sent from a control section (not shown) thereby driving the motor 2 to rotate, the nut portion 15 which is engaged with the threaded portion 3a is allowed to readily travel on the lead screw 3 within a predetermined range. In this state, since the nut portion 15 is urged by the coil spring 19 toward the motor 2, the magnet segment 8b of the rotor 6 presses the resin washer 20 directly against the rear bearing 10 thus eliminating the gap 14 (refer to FIG. 2).

In this connection, since the rear bearing 10 is partly located inside the stator sub-assembly B while no portion of the front bearing 9 is located inside the stator sub-assembly A, the gap 13 formed toward the front bearing 9 is greater than the gap 14 formed toward the rear bearing 10.

Consequently, the rotor 6 is allowed to move substantially toward the front bearing 9 (left direction in the figure) compared to the state illustrated in FIG. 4A/4B so that the magnetic centers of the magnet segments 8a and 8b become shifted substantially toward the front bearing 9 with respect to the magnetic centers of the stator sub-assemblies A and B, respectively.

(Operational State Illustrated in FIG. 4A/4B)

It is configured such that when the nut portion 15 of the movable structure is situated as shown in FIG. 3A/3B and the stator sub-assemblies A and B are excited thereby driving the motor 2 to rotate, for example, in the positive direction, the nut portion 15 is caused to travel toward the distal end (left side in the figure) of the lead screw 3 to such an extent as to stay within a controlled range (not to go off the threaded portion 3a).

However, if the control section (not shown) goes wrong due to some external disturbance (for example, external noises) and drives the motor 2 to run abnormally, the nut portion 15 is forced to travel further toward the distal end of the lead screw 3 against the urging force of the coil spring 19 so that the movable member body 16 of the movable structure comes closer to the distal side plate 4b of the bracket 4 and the nut portion 15 arrives at the first idle region 3b as shown in FIG. 4A/4B.

At this state, the nut portion 15 is already located at the first idle region 3b of the lead screw 3 and therefore is disengaged from the threaded portion 3a of the lead screw 3 thus allowing the lead screw 3 to rotate idle, whereby damages resulting from forced engagement between the nut portion 15 and the threaded portion 3a can be prevented.

When the supply of current for exciting the stator sub-assemblies A and B is cut off, the motor 2, which has been running abnormally, is caused to stop rotation, and the nut portion 15 is moved toward the motor 2 by the urging force of the coil spring 19 and comes in contact with the left end of the threaded portion 3a of the lead screw 3. And, when the control section (not shown) is back to normal and starts exciting the stator sub-assemblies A and B in such a manner as to rotate the motor 2 backward, that is in the negative direction, the nut portion 15, which is now in contact with the left end of the threaded portion 3a of the lead screw 3, readily meshes with the threaded portion 3a because the urging force of the coil spring 19 acts on the movable structure, specifically on the guide block portion 18 thereof (refer to FIG. 1).

(Operational State Illustrated FIG. 5A/5B)

It is configured such that when the nut portion 15 of the movable structure is situated as shown in FIG. 3A/3B and the stator sub-assemblies A and B are excited thereby driving the motor 2 to rotate now in the reversed direction, the nut portion 15 is caused to travel toward the proximal end (right side in the figure) of the lead screw 3 to such an extent as to stay within a controlled range (not go off the threaded portion 3a). In this state, since the nut portion 15 is urged toward the motor 2 by the coil spring 19, the magnet segment 8b of the rotor 6 presses the resin washer 20 directly against the rear bearing 10 thus eliminating the gap 14.

However, when the control section (not shown) goes wrong due to some external disturbance (for example, external noises) and drives the motor 2 to run abnormally, the nut portion 15 is forced to go over a predetermined point and travel further toward the proximal end of the lead screw 3 as shown in FIG. 5A/5B, and the lead screw 3 is caused to move away from the motor 2 due to the malfunction, which causes the magnet segment 8a to press the resin washer 20 directly against the front bearing 9 consequently making the gap 13 disappear.

When the movable member body 16 of the movable structure is brought into contact with the proximal side plate 4c of the bracket 4, the nut portion 15 is stopped from moving further. However, the motor 2 continues to run thereby disengaging the nut portion 15 from the threaded portion 3a of the lead screw 3, and thus the nut portion 15 is located at the second idle region 3c. In this state, even if the motor 2 is driven to rotate, the lead screw 3 is to rotate idle without engagement with the nut portion 15 thereby preventing forced engagement between the nut portion 15 and the threaded portion 3a of the lead screw 3.

When the supply of current for exciting the stator sub-assemblies A and B is cut off, the motor 2, which has been running abnormally, is caused to stop rotation. At this state, since the magnetic centers of the magnets 8a and 8b are shifted from the magnetic centers of the stator sub-assemblies A and B, the magnet segments 8a and 8b are moved by a magnetic attractive force (magnetic thrust) in such a direction as to make their magnetic centers coincide with the magnetic centers of the stator sub-assemblies A and B, whereby the rotor 6 including the magnet segments 8a and 8b is caused to move toward the rear bearing 9 (right direction in the figure).

When the rotor 6 moves as described above, the proximal side end (right end in the figure) of the threaded portion 3a of the lead screw 3 is brought into contact with the nut portion 15. And, when the control section (not shown) returns to function normally and duly excites the stator sub-assemblies A and B thereby causing the motor 2 to restart its rotation in the positive direction, the nut portion 15, which is now in contact with the right end of the threaded portion 3a of the lead screw 3, engages readily therewith, and the normal state is regained.

In the present embodiment, the lead screw 3 is moved to return to the normal operation while neither of the stator sub-assemblies A and B is excited, but the present invention is not limited to such an arrangement and one stator sub-assembly, for example B, may be excited (so-called one-phase excitation) thereby increasing the magnetic attractive force (magnetic thrust). Also, both of the stator-subassemblies A and B may be excited (two-phase excitation) for amplifying the magnetic attractive force. When the magnetic attractive force is amplified, the nut portion 15 can be more reliably brought into contact with the right end of the threaded portion 3a of the lead screw 3, thus being highly effective.

According to the present invention, as described above, a sufficient open space is provided with respect to the thrust direction and also idle regions are provided on the lead screw, whereby when the motor goes out of control (the motor runs abnormally) and the movable member body of the movable structure comes into contact with one of the side plates of the bracket as stopper means, the rotary shaft is allowed to axially move thanks to the open space provided with respect to the thrust direction thereby causing the nut portion to get on the idle region of the lead screw, wherein the nut portion of the movable structure stays on the idle region even if the motor continues to run abnormally, thus preventing forced engagement between the nut portion and the threaded portion of the lead screw.

When the supply of power is cut off for stopping the motor from running abnormally, the rotor is moved by the magnetic thrust force of the motor to the magnetically stable point, and the nut portion and the threaded portion of the lead screw come into contact with each other. At this state, only if the power is supplied to rotate the motor in the reversed direction, the nut portion can get on and travel on the threaded portion without applying any additional urging force. The magnetic thrust force of the motor must be optimally determined to enable the nut portion to duly return into engagement with the lead screw.

With regard to the purpose of the optimal determination, the dual-magnet rotor 6 including the two magnet segments 8a and 8b which oppose the stator sub-assemblies A and B, respectively, can exert a more effective magnetic thrust force than a rotor including only one magnet. Also, the dual-magnet rotor can be placed in hold state in which electrical conduction change is not made between phases in the two-phase excitation. Moreover, only the phase B may be excited (one phase excitation) to further increase the magnetic thrust force thereby increasing the attractive force so that the nut portion can be further reliably put into engagement with the lead screw.

In the present invention, since the rotor is allowed to move axially to an increased extent, the rotary shaft must be long enough at the rear end portion so as not to come off the rear bearing when the rotor is moved toward the front bearing. Also, the rear bearing must be dimensioned and configured to cover up the rear end portion of the rotary shaft In the embodiment described above, the motor is a general PM stepping motor, but the present invention is not limited to such a motor arrangement but other type PM stepping motors or any other motors than a PM stepping motor may be used. Also, according to the present invention, the coil spring is for allowing the movable structure smoothly travel on the lead screw and therefore is designed to have only a decent elastic force wherein the repulsion force, while strong in the state of FIG. 4A/4B, is very weak in the state of FIG. 5A/5B where the coil spring is nearly fully extended. Accordingly, the magnetic thrust force raised by a recovery means accounts largely in the state shown in FIG. 5A/5B.

While the present invention has been described with respect to the specific embodiment, it is to be understood that the present invention is by no means limited thereto but encompasses all changes and modifications that will become possible within the scope of the appended claims. For example, in the embodiment described above, the actuator is applied for a mechanism for driving a lens but may be used for actuating any appropriate items.

What is claimed is:

1. An actuator for a lens driving mechanism, the actuator comprising:
    a motor comprising a stator and a rotor which comprises a rotary shaft and a magnet fixed around the rotary shaft, wherein a threaded portion is disposed at a portion of the rotary shaft axially protruding from one end of the motor, and wherein two idle regions are disposed respectively at both ends of the threaded portion;
    a movable structure which meshes with the rotary shaft and to which a lens is attached, wherein the movable structure, when located at the threaded portion, travels along the rotary shaft by a rotation of the rotary shaft, and wherein the motor runs idle with respect to the movable structure when the movable structure is located at the idle region;
    a stopper means configured to restrict an axial movement of the movable structure;
    an open space disposed inside the motor and configured to allow the rotary shaft to axially move;
    an urging means for urging the movable structure toward the motor; and
    a recovery means for bringing the movable structure toward the threaded portion of the rotary shaft when the movable structure is moved to one of the idle regions so as to make contact with the stopper means.

2. An actuator for a lens driving mechanism according to claim 1, wherein the recovery means is constituted by a magnetic thrust force present between the stator and the magnet of the rotor.

3. An actuator for a lens driving mechanism according to claim 2, wherein the magnetic thrust force results from a misalignment between a magnetic center of the magnet of the rotor and a magnetic center of the stator, the misalignment caused by an axial movement of the rotor.

4. An actuator for a lens driving mechanism according to any one of claim 2, wherein the motor is a stepping motor in which the stator comprises two stator sub-assemblies stacked axially on each other, each of the stator sub-assemblies comprising a yoke composed of inner and outer yokes both having a plurality of pole teeth at their inner circumferential surface, a bobbin, and a winding wound in a ring form around the bobbin and disposed inside the yoke, and in which the magnet of the rotor has a cylindrical shape, is disposed inside the stator with the rotary shaft rotatably supported by two bearings and is sandwiched between the two bearings such that a gap formed between one bearing and the magnet is greater than a gap formed between the other bearing and the magnet, and wherein the magnetic thrust force is exerted when at least one of the two stator sub-assemblies is excited.

5. An actuator for a lens driving mechanism according to claim 4, wherein the magnet of the rotor is axially separated into two segments radially opposing the two sub-assemblies, respectively.

6. An actuator for a lens driving mechanism according to claim 1, wherein the stopper means is two bent-up side plates of a bracket to which the motor is attached.

7. An actuator for a lens driving mechanism according to claim 1, wherein the urging means is a coil spring disposed over a guide rod which passes through a through-hole of the movable structure and which is oriented parallel to the rotary shaft.

8. An actuator for a lens driving mechanism, the actuator comprising:
- a motor comprising a stator and a rotor which comprises a rotary shaft and a magnet fixed around the rotary shaft, wherein a threaded portion is disposed to extend from a portion of the rotary shaft axially protruding from one end of the motor, and wherein two idle regions are disposed respectively at both ends of the threaded portion;
- a movable structure which meshes with the rotary shaft and to which a lens is attached;
- first recovery means for urging the movable structure located at one of the two idle regions toward the threaded portion, wherein the movable structure is urged by a force generated by a spring member; and
- a second recovery means for urging the movable structure located at the other one of the two idle regions toward the threaded portion, wherein the movable structure is urged by a magnetic attractive force acting between the stator and the magnet of the rotor.

* * * * *